United States Patent [19]

Shank et al.

[11] Patent Number: 4,711,518

[45] Date of Patent: Dec. 8, 1987

[54] FIBER OPTIC CONNECTOR

[75] Inventors: Jeffrey B. Shank; Steven E. Swanson; Barry J. Opdahl, all of Williamsport, Pa.

[73] Assignee: GTE Products Corporation, Stamford, Conn.

[21] Appl. No.: 801,254

[22] Filed: Nov. 25, 1985

[51] Int. Cl.$^4$ .......................... G02B 6/36; G02B 6/32
[52] U.S. Cl. .................. 350/96.20; 350/96.15; 350/96.18
[58] Field of Search ............... 350/96.15, 96.18, 96.20

[56] References Cited

U.S. PATENT DOCUMENTS 4,531,810  7/1985  Carlsen .......................... 350/96.2

FOREIGN PATENT DOCUMENTS 0104416  4/1984  European Pat. Off. ............ 350/96.2
2139779  11/1984  United Kingdom ............. 350/96.23

Primary Examiner—Eugene R. LaRoche
Assistant Examiner—James C. Lee
Attorney, Agent, or Firm—William H. McNeill

[57] ABSTRACT

An optical fiber lens-connector assembly includes a plastic lens body joined to a tubular connector of a low thermal expansion glass. The connector includes a glass fiber guide formed of the same material (e.g., a borosilicate glass) having a substantially similar expansion coefficient. The assembly provides greater temperature stability when cycled over a wide temperature range. Fused silica quartz can also be employed as the connector material.

5 Claims, 2 Drawing Figures

FIBER OPTIC CONNECTOR

TECHNICAL FIELD

This invention relates to connectors for optical fibers and more particularly to connectors for joining an optical fiber to an expanded beam lens.

BACKGROUND ART

Optical fibers are finding increasing use in telecommunications as well as in other data transmission systems because of their ability to carry vastly more information than equivalent sizes of electrical wire. Connecting two or more optical fibers, however, requires much more care than equivalent electrical connections since the fibers must be optically aligned. Many forms of optical connectors have been proposed to achieve the desired compatability of such connections; and include butt-to-butt joints of cleaved and polished fibers; and expanded beam lenses.

This invention is particularly concerned with improving the latter. Such expanded beam lens connectors are shown in U.S. Pat. No. 4,421,383. Connectors made in accordance with this patent have greatly advanced the art and function well within a temperature range of about 15° C. to 30° C. However, thermal cycling at temperature extremes, say, −40° C. to +60° C., has been shown to cause acrylic growth which creates a shift of position within the fiber-to-lens interface. This shift causes increased attenuation and, occassionally, complete failure.

DISCLOSURE OF THE INVENTION

It is, therefore, an object of this invention to obviate the disadvantages of the prior art.

It is another object of the invention to enhance fiber optic connectors.

Yet another object of the invention is the provision of an optical fiber connector which maintains functional integrity at temperature extremes.

These objects are accomplished, in one aspect of the invention, by the provision of an optical fiber-lens connector assembly. The assembly comprises a lens body having a head end and a tail end. A connector for joining an optical fiber to the lens comprises a generally tubular body having a longitudinal axis formed to fittingly receive the tail end of the lens. The tubular body is formed from a glassy material having a low thermal expansion coefficient. A fiber guide is positioned within the tubular body.

The fiber guide is formed from the same material as the tubular body and includes a longitudinal aperture for receiving an optical fiber.

This assembly prevents movement of the fiber at the lens interface because of the low thermal expansion coefficient of the glass. While growth of the lens body still occurs during temperature cycling, the fiber to lens interface remains constant.

DESCRIPTION OF THE PREFERRED EMBODIMENTS

For a better understanding of the present invention, together with other and further objects, advantages and capabilities thereof, reference is made to the following disclosure and appended claims taken in conjunction with the above-described drawings.

Figure 1:
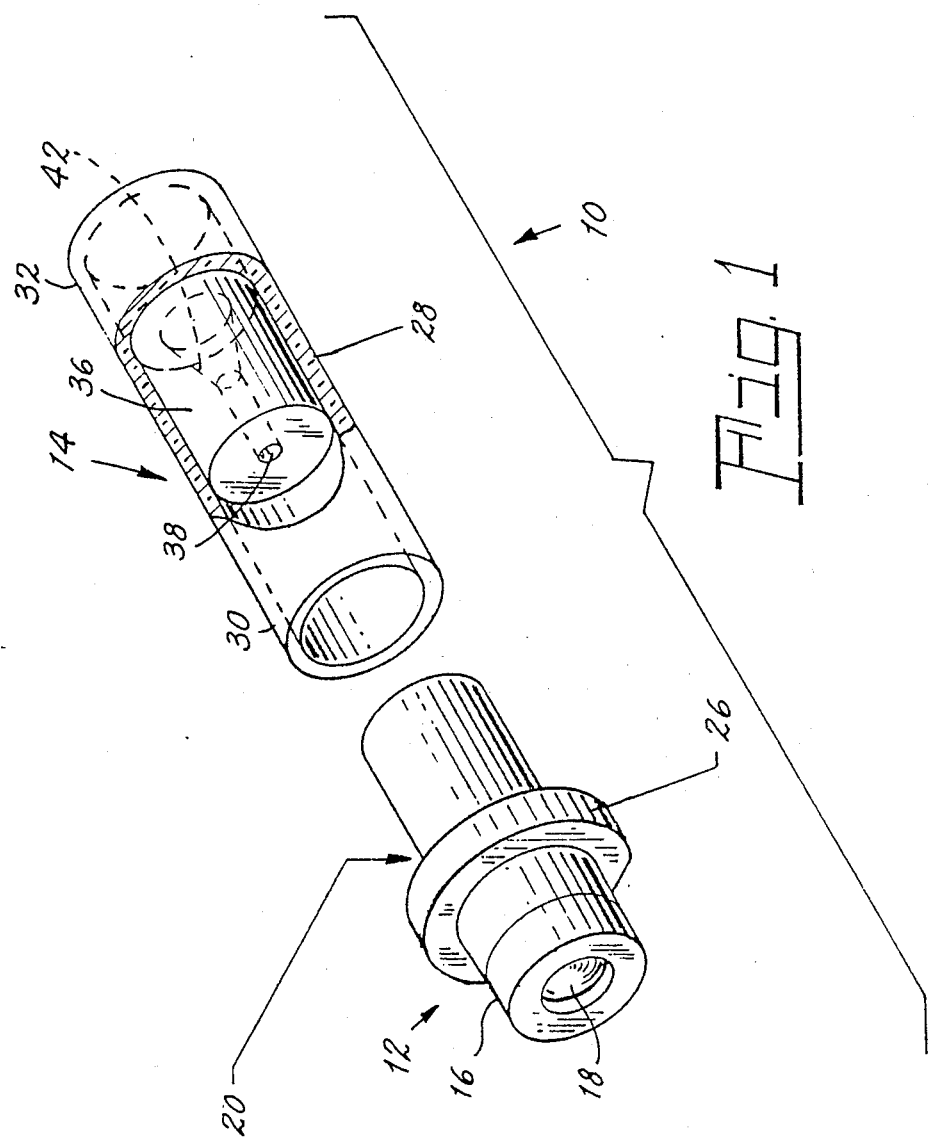
FIG. 1 is an exploded, perspective view of a lens-connector assembly.

Referring now to the drawings with greater particularity, there is shown in FIG. 1 an optical fiber lens-connector assembly 10 which comprises a lens body 12 and a connector 14. The lens body 12 is molded of optical quality plastic and can be of a design similar to, and molded from the materials employed, with that shown in U.S. Pat. No. 4,421,383.

Figure 2:
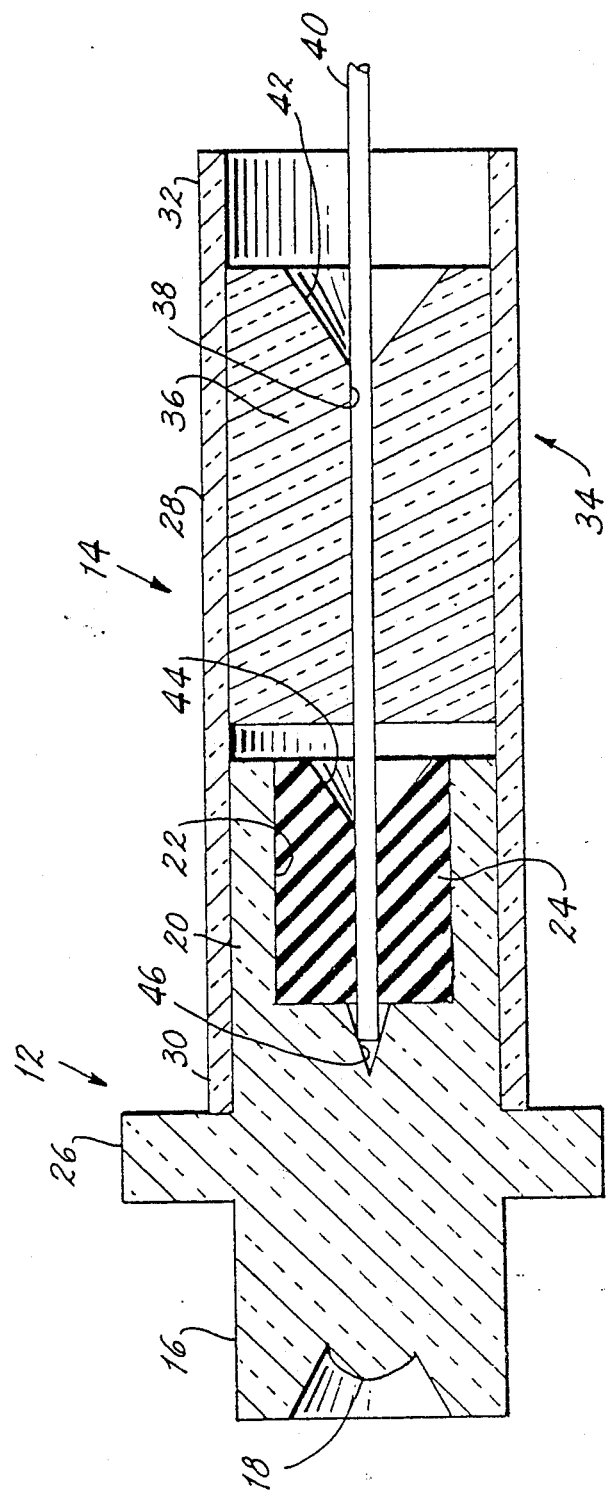
FIG. 2 is an elevational, sectional view of a lens-connector assembly with an optical fiber in place.

Body 12 has a head end 16 which includes a recessed lens 18 formed therein, and a tail end 20 of substantially cylindrical configuration. The tail end 20 contains an axial cavity 22 (FIG. 2) which contains an elastomeric fiber holder 24, which can be similar in principle to the elastomeric splices described in U.S. Pat. Nos. 4,257,674 or 4,325,607. A shoulder 26 is provided intermediate the head end 16 and the tail end 20 and projects radially outward from the lens body 12.

The connector 14 comprises a generally tubular body 28 having a longitudinal axis and an internal diameter sized to receive the tail end 20 of lens body 12. The body 28 is formed of a material having a low thermal expansion coefficient; i.e., a material having a thermal expansion coefficient of about $5.6 \times 10^{-7}/°C$. to $32.5 \times 10^{-7}/°C$. between the temperature range of 0° C. to 300° C. Suitable materials are fused silica quartz and borosilicate glasses.

Connector body 28 has a first end 30, a second end 32 and an intermediate portion 34 therebetween. A fiber guide 36 has an external diameter substantially matching the internal diameter of body 28 and is positioned in the intermediate portion 34. The fiber guide 36 is held in place by an ultraviolet sensitive adhesive, such as Norland Optical Adhesive 81, available from the Norland Products, Inc.

The fiber guide 36 has a longitudinal, optical fiber receiving aperture 38 therethrough and is formed from the same material as the tubular body 28.

When a borosilicate glass is employed, it preferably has a composition of 81% $SiO_2$; 2% $Al_2O_3$; 13% $B_2O_3$ and 4% $NaO_2$, all percentages being by weight.

The connector 14 is bonded to lens body 12 (at tail end 20) by a suitable ultraviolet sensitive adhesive or a heat cured epoxy.

When assembly 10 is completed, an optical fiber 40 is inserted through aperture 38 in fiber guide 36 (via conical portion 42), through the elastomeric fiber holder 24 (via conical portion 44) until it abuts the functional surface 46 formed in lens body 12. The optical fiber 40 is secured in place by an ultraviolet sensitive adhesive. The adhesive is applied via conical portion 42 and is drawn in around the fiber by capillary action. The light thruput is then optimized and the adhesive solidified by exposure to an ultraviolet source.

This assembly thus provides increased stability of the lens because of the low thermal expansion coefficients of the connector 14.

While there have been shown and described what are at present considered to be the preferred forms of the invention, it will be apparent to those skilled in the art that various changes and modifications can be made herein without departing from the scope of the invention as defined by the appended claims.

We claim:

1. An optical fiber-lens connector assembly comprising: a lens body formed of transparent material, said lens body including a head end having a lens formed therein, a tail end of substantially cylindrical configuration having an axial cavity therein formed to receive an elastomeric fiber holder, and a shoulder formed intermediate said head end and said tail end and projecting radially outward from said lens body; and a connector for joining an optical fiber to said lens body, said connector comprising: a generally tubular body having a longitudinal axis and a given internal diameter formed to fittingly receive said tail end of said lens body, said tubular body being formed of a material selected from the group of fused silica quartz and borosilicate glasses having a low thermal expansion coefficient, said body having a first end and a second end; and a substantially cylindrical fiber guide positioned within said tubular body intermediate said first and second ends thereof, said fiber guide having an external diameter substantially matching said internal diameter of said tubular body and having a longitudinal, optical fiber receiving aperture therethrough, said fiber guide being formed from the same material as said tubular body.

2. The assembly of claim 1 wherein said fiber guide is cemented within tubular body.

3. The assembly of claim 2 wherein said cement is an ultraviolet sensitive adhesive.

4. The assembly of claim 3 wherein an axially apertured elastomeric fiber holder is positioned in said tail end.

5. The assembly of claim 4 wherein an optical fiber is positioned in said fiber guide and penetrates said elastomeric fiber holder to abut against a functional surface of said lens body.

* * * * *